US010489527B2

United States Patent
Gordon et al.

(10) Patent No.: US 10,489,527 B2
(45) Date of Patent: Nov. 26, 2019

(54) METHOD AND APPARATUS FOR CONSTRUCTING AND USING ABSORBING BOUNDARY CONDITIONS IN NUMERICAL COMPUTATIONS OF PHYSICAL APPLICATIONS

(71) Applicant: Dan Gordon, Haifa (IL)

(72) Inventors: Dan Gordon, Haifa (IL); Rachel Gordon, Haifa (IL); Eli Turkel, Raanana (IL)

( * ) Notice: Subject to any disclaimer, the term of this patent is extended or adjusted under 35 U.S.C. 154(b) by 335 days.

(21) Appl. No.: 15/315,586

(22) PCT Filed: Jun. 2, 2015

(86) PCT No.: PCT/IL2015/050567
§ 371 (c)(1),
(2) Date: Dec. 1, 2016

(87) PCT Pub. No.: WO2015/186130
PCT Pub. Date: Dec. 10, 2015

(65) Prior Publication Data
US 2017/0206288 A1    Jul. 20, 2017

Related U.S. Application Data

(60) Provisional application No. 62/006,909, filed on Jun. 3, 2014.

(51) Int. Cl.
G06F 17/50 (2006.01)
G06F 17/13 (2006.01)

(52) U.S. Cl.
CPC .......... *G06F 17/5009* (2013.01); *G06F 17/13* (2013.01); *G06F 17/5018* (2013.01)

(58) Field of Classification Search
CPC ... G06F 17/5009; G06F 17/13; G06F 17/5018
(Continued)

(56) References Cited

U.S. PATENT DOCUMENTS 4,611,312 A     9/1986   Ikeda
5,265,040 A *  11/1993   Saji .................. G06F 17/13
                                               345/441
(Continued)

OTHER PUBLICATIONS

Zarmi et al, "A general approach for high order absorbing boundary conditions for the Helmholtz equation", 2013, Elsevier (Year: 2013).*
(Continued)

*Primary Examiner* — Kamini S Shah
*Assistant Examiner* — Faraj Ayoub
(74) *Attorney, Agent, or Firm* — Browdy and Neimark, PLLC

(57) ABSTRACT

A gradient method (GM) for constructing and using absorbing boundary conditions (ABCs) for high accuracy numerical computations of various physical phenomena which are governed by partial differential equations (PDEs) is disclosed. The PDEs to which the GM is applicable are for example: the Helmholtz equation (also known as the wave equation in the frequency domain), the elastic wave equation in the frequency domain, Maxwell's equations, and Schrodinger's equation. The GM can be used to develop ABCs for the solution of PDE problems in two or more dimensions. The GM is a tool based on two principles: (1) Any directional derivatives in an ABC must be taken in the direction of the gradient of the unknown function or functions of the PDE, and (2) any ABC using such gradient derivatives may be applied to any domain of a convex shape, even if the ABC was originally developed for domains of a restricted shape.

11 Claims, 5 Drawing Sheets

(58) Field of Classification Search
USPC .......................................................... 703/2
See application file for complete search history.

(56) References Cited

U.S. PATENT DOCUMENTS

| | | | |
|---|---|---|---|
| 6,687,659 B1 | 2/2004 | Shen | |
| 2003/0105641 A1 | 6/2003 | Lewis | |
| 2010/0296367 A1 | 11/2010 | Ching et al. | |
| 2011/0310669 A1 | 12/2011 | Ching et al. | |
| 2011/0310699 A1* | 12/2011 | Robertsson | G01V 1/282 367/21 |

OTHER PUBLICATIONS

Appelo, "Non-reflecting Boundary Conditions for Wave Propagation Problems" Licenciate's Thesis Royal Institute of Technology, pp. 1-83 (Dec. 2003).

Clayton et al., "Absorbing Boundary Conditions for Acoustic and Elastic Wave Equations", Bulletin of the Seismological Society of America, pp. 1529-1540, vol. 67, No. 6 (Dec. 1977).

Bamberger, P. et al., "Second-order absorbing boundary conditions for the wave equation: A solution to the corner problem", SIAM J. on Numerical Analysis, pp. 323-352, vol. 27, No. 2 (Apr. 1990).

Bayliss, M. et al., "Boundary Conditions for the numerical solution of elliptic equations in exterior regions" SIAM J. of Applied Mathematics, pp. 430-451, vol. 42 (Apr. 1982).

J.-P. Berenger, "A perfectly matched layer for the absorption of electromagnetic waves", Journal of Computational Physics, pp. 185-200, vol. 114 (Jul. 1993).

J.-P. Berenger, "Three dimensional perfectly matched layer for the absorption of electromagnetic waves", Journal of Computational Physics, pp. 363-379, vol. 127 (Mar. 1995).

B. Engquist et al., "Absorbing boundary conditions for the numerical simulation of waves" Applied Mathematical Sciences, pp. 1765-1766, vol. 74, No. 5 (Feb. 1977).

D. Givoli, "High-order local non-reflecting boundary conditions: a review", Wave Motion pp. 319-326, vol. 39, No. 4 (Oct. 2003).

D. Gordon et al., "CARP-CG: a robust and efficient parallel solver for linear systems, applied to strongly convection dominated PDEs", Parallel Computing, pp. 495-515, vol. 36 (Jun. 2010).

Y. Li. et al., "2D and 3D frequency-domain elastic wave modeling in complex media with a parallel iterative solver", Geophysics, pp. T101-T118, vol. 80 No. 3 (Jun. 2015).

M. Medvinsky et al., "Local absorbing boundary conditions for elliptical shaped bodies", Journal of Computational Physics, pp. 8254-8267, vol. 227 (Jul. 2008).

J. Pujol, "Elastic Wave Propagation and Generation in Seismology" Cambridge University Press, Cambridge, UK, 2003.

A. Sommerfeld, "Partial Differential Equations in Physics", Section 28, pp. 188-200, Academic Press, New York, 1964.

E. Turkel et al., "Compact 2D and 3D sixth order schemes for the Helmholtz equation with variable wave Number", Journal of Computational Physics, pp. 272-287, vol. 232, No. 1 (Aug. 2012).

T. van Leeuwen, D. "Preconditioning the Helmholtz equation via row projections", In Proc. 74th EAGE Conference, Copenhagen, Denmark, pp. 60-65. EAGE, (Jun. 2012).

T. van Leeuwen et al., "3D frequency-domain seismic inversion with controlled sloppiness", SIAM Journal on Scientific Computing, pp. S192-S217, vol. 36, No. 5 (Mar. 2014).

J. Virieux et al., "An overview of full-waveform inversion in exploration geophysics", Geophysics, pp. wcc127-wcc152, vol. 74, No. 6 (Dec. 2009).

D. Gordon et al., "Compact high order schemes with gradient-direction derivatives for absorbing boundary conditions" Journal of Computational Physics, pp. 295-315, vol. 297 (Sep. 2015).

* cited by examiner

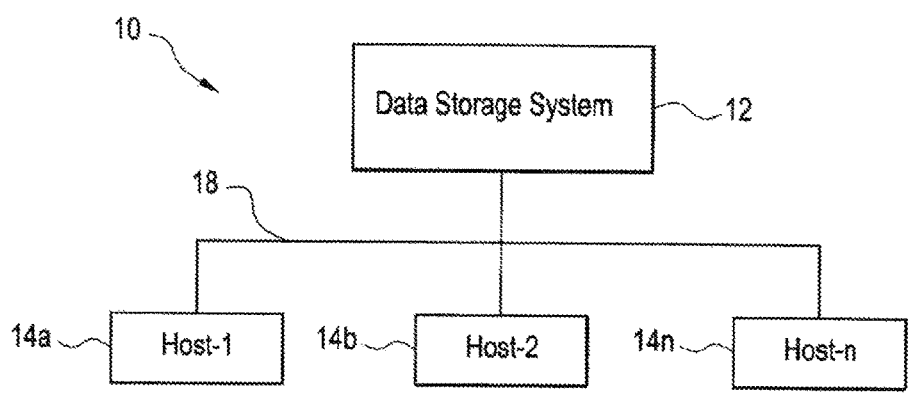
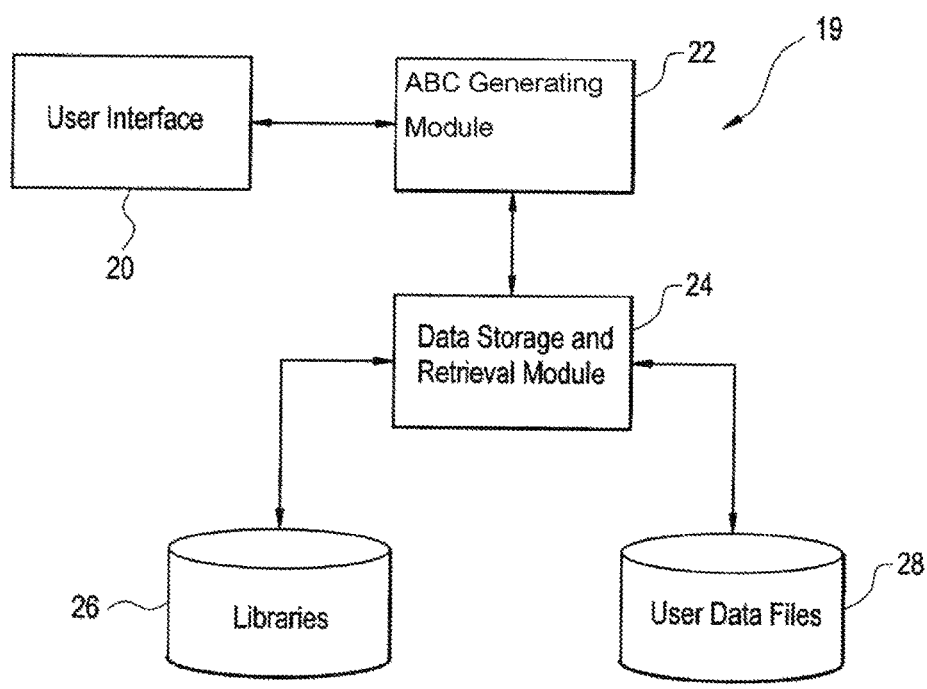

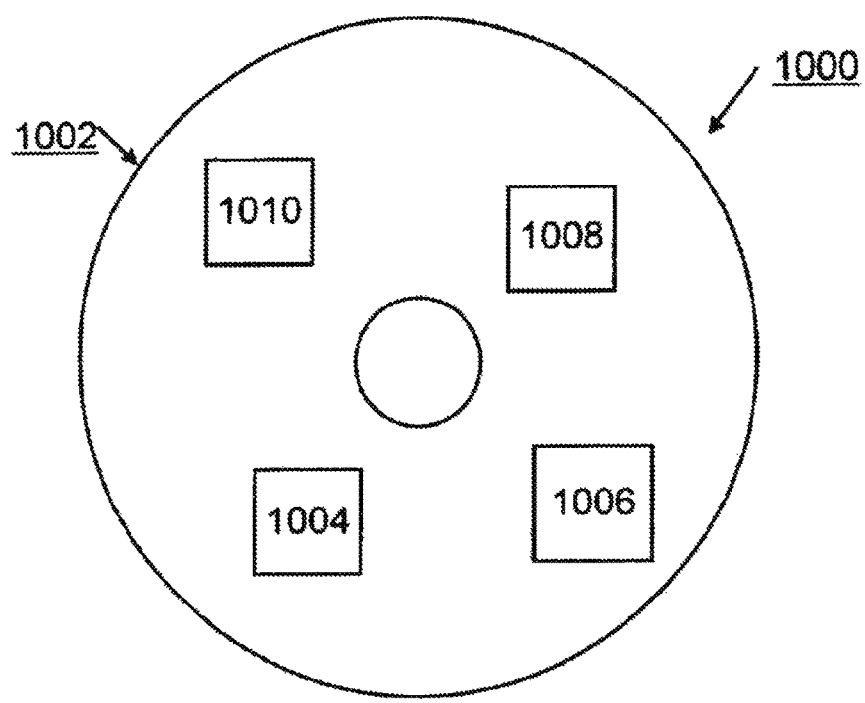

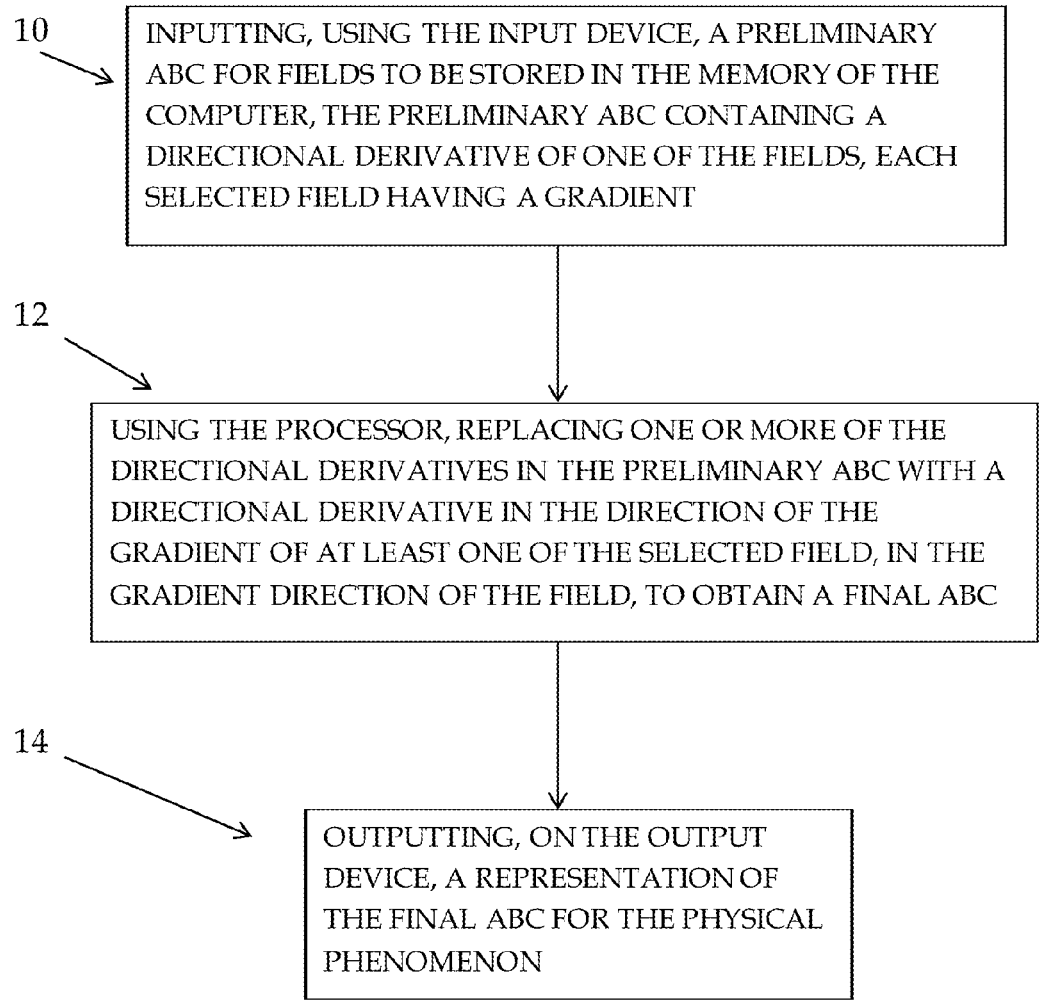

FIG. 5
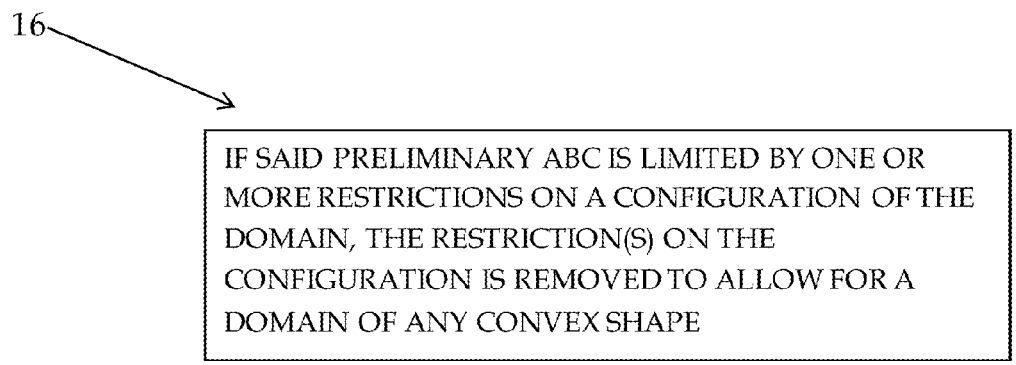
OR
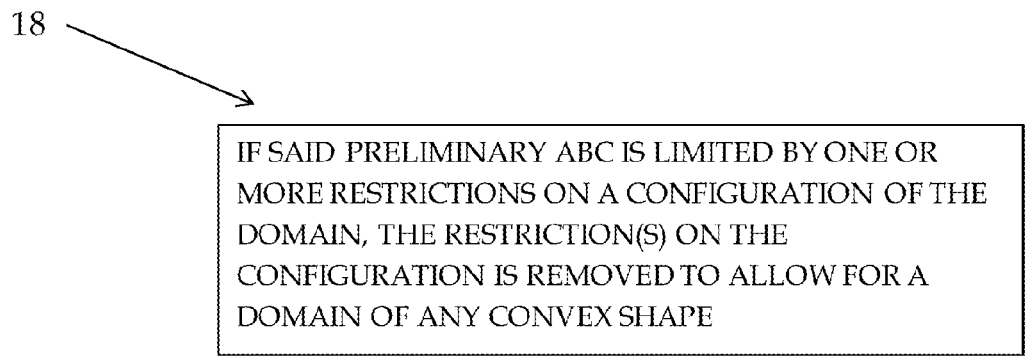

20

METHOD AND APPARATUS FOR CONSTRUCTING AND USING ABSORBING BOUNDARY CONDITIONS IN NUMERICAL COMPUTATIONS OF PHYSICAL APPLICATIONS

FIELD OF THE INVENTION

The present invention relates to computer simulation of physical waves.

BACKGROUND OF THE INVENTION

The following prior art references, which are incorporated by reference in their entirety herein, are considered to be relevant for an understanding of the invention:

[1] A. Bamberger, P. Joly and J. E. Roberts. Second-order absorbing boundary conditions for the wave equation: A solution to the corner problem. *SIAM J. on Numerical Analysis* 27(2):323-352, 1990.

[2] A. Bayliss, M. Gunzburger and E. Turkel. Boundary Conditions for the numerical solution of elliptic equations in exterior regions. *SIAM J. of Applied Mathematics* 42:430-451, 1982.

[3] J.-P. Berenger. A perfectly matched layer for the absorption of electromagnetic waves. *J. of Computational Physics* 114:185-200, 1994.

[4] J.-P. Berenger. Three dimensional perfectly matched layer for the absorption of electromagnetic waves. *J. of Computational Physics* 127:363-379, 1996.

[5] B. Engquist and A. Majda. Absorbing boundary conditions for the numerical simulation of waves. *Mathematics of Computation* 31:629-651, 1977.

[6] D. Givoli. High-order local non-reflecting boundary conditions: a review. *Wave Motion* 39(4):319-326, 2004.

[7] D. Gordon and R. Gordon. CARP-CG: a robust and efficient parallel solver for linear systems, applied to strongly convection dominated PDEs. *Parallel Computing* 36:495-515, 2010.

[8] Y. Li, L. Metivier, R. Brossier, B. Han and J. Virieux. 2D and 3D frequency-domain elastic wave modeling in complex media with a parallel iterative solver. *Geophysics* 80(3):T101T118, 2015.

[9] M. Medvinsky, E. Turkel and U. Hetmaniuk. Local absorbing boundary conditions for elliptical shaped bodies. *J. of Computational Physics* 227:8254-8267, 2008.

[10] J. Pujol. *Elastic Wave Propagation and Generation in Seismology*. Cambridge University Press, Cambridge, UK, 2003.

[11] A. Sommerfeld. *Partial Differential Equations in Physics*, Section 28, pages 188-200, Academic Press, New York, 1964.

[12] E. Turkel, D. Gordon, R. Gordon and S. Tsynkov. Compact 2D and 3D sixth order schemes for the Helmholtz equation with variable wave Number. *J. of Computational Physics* 232(1):272-287, 2013.

[13] T. van Leeuwen, D. Gordon, R. Gordon, and F. Herrmann. Preconditioning the Helmholtz equation via row projections. In *Proc. 74th EAGE Conference*, Copenhagen, Denmark, 60-65. EAGE, June 2012.

[14] T. van Leeuwen and F. Herrmann. 3D frequency-domain seismic inversion with controlled sloppiness. *SIAM J. on Scientific Computing* 36(5):5192-5217, 2014.

[15] J. Virieux and S. Operto. An overview of full-waveform inversion in exploration geophysics. *Geophysics* 74(6):wcc127wcc152, 2009.

[16] D. Gordon, R. Gordon, and E. Turkel *Compact high order schemes with gradient-direction derivatives for absorbing boundary conditions.*, Journal of Computational Physics, Volume 297, 15 Sep. 2015, Pages 295-315. (Not prior art as it was published after the filing date of this application and is a publication of the present inventors).

[17] U.S. Pat. No. 6,687,659 to Y. Shen.

Many physical phenomena are governed by partial differential equations (PDEs). Examples of such phenomena are acoustic waves (governed by the wave equation), electromagnetic radiation (Maxwell's equations), earthquakes (the elastic wave equation), and the quantum state of a physical system (Schrödinger's equation). The propagation of such physical phenomena through three-dimensional (3D) space is often caused by some physical occurrence; for example, earthquakes create seismic waves which propagate in a large volume of the earth. For such physical phenomena, there is often a practical need to obtain information about the material in which the phenomenon occurred. A case in point is exploration geophysics, the science lying behind various techniques for obtaining a three-dimensional image of a volume of the earth. Such information is important in order to detect the composition of the volume and pinpoint important areas of special interest such as water or oil. In the case of exploration geophysics, raw data is typically obtained by sensors placed over the surface of interest, and special machinery impacts the surface at many points. The sensors measure the vibrations caused by the impacts, and the data is gathered and prepared for processing by electronic computers. There are several methods for obtaining an image of the volume of interest. One of the modern methods is called "full waveform inversion", abbreviated FWI. This method is well-known in the field, and it is described in detail in [15]. A crucial step in FWI, which is repeated many times, is the solution of the Helmholtz equation (also known as the "wave equation in the frequency domain"). To this end, the data is modeled by a three-dimensional grid of points corresponding to the volume of interest. The input data to the solver of the Helmholtz equation consists of the value of the speed of sound at every grid point. A numerical method is then applied to the data with the purpose of solving the Helmholtz equation for the given data set. The solution of the Helmholtz equation is a displacement value at every grid point. For the purpose of expediting the calculations, it is essential to perform the calculations as efficiently as possible so as to minimize the number of required computers, their memory, and the time to complete the calculations. In addition, it is essential to obtain as accurate a solution as possible for the Helmholtz equation.

The reverberations in the earth generated by the impacts travel well beyond the actual region of interest. However, the grid imposed by the numerical computations must be finite, because the computer cannot handle a potentially infinite domain. As a result, it is necessary to impose certain conditions on the boundary of the grid that will simulate the fact that the reverberations actually travel beyond the region of interest. Such numerical conditions are called "absorbing boundary conditions" (ABCs), or "non-reflecting boundary conditions". In addition to the numerical conditions, some ABCs also require certain conditions to be imposed on the physical configuration of the problem being solved. For example, there may be restrictions on the geometrical shape of the domain and/or the position of the source of impact causing the physical phenomenon within the domain.

The theory lying behind ABCs is very extensive and generally well known by practitioners of the art. For a review of ABCs, see [6]. ABCs are used to impose certain numerical conditions on the boundaries of the finite grid which correspond to the physical domain of interest. ABCs simulate the fact that in the real world, physical phenomena caused by some disturbance in the domain of interest have an effect well beyond the relatively small domain. Without ABCs, the obtained numerical solution can appear to be reflected from the boundaries. Accurate ABCs are essential to the process of solving the Helmholtz equation; without them, the solution of the equation may not be sufficiently accurate, and this might hamper the entire FWI process. U.S. Pat. No. 6,687,659 (incorporated by reference in its entirety herein) teaches a specific ABC of a certain class of ABCs, known as "perfectly matched layers" (PML).

Another area in which ABCs are required is that of electromagnetic radiation, which is governed by Maxwell's equations. In fact, the PML method was originally devised for such problems; see [3,4]. A typical problem in this area consists of one or more sources of electromagnetic radiation and some objects reflecting the electromagnetic radiation. One then wishes to find the values of the electromagnetic radiation field at grid points in some volume of interest. Since electromagnetic radiation extends to a potentially infinite domain, it is necessary to impose ABCs at the boundaries of the domain of interest.

In all of the above-mentioned areas, there are one or more field values to be determined in the volume of interest by solving the numerical problem. For example, in the Helmholtz equation, it is necessary to determine the value of the displacement, usually denoted by u, at each grid point. In electromagnetic radiation, there are two values to determine: the electric field and the magnetic field. PML methods specify certain equations that must hold in a layer of several extra grid points surrounding the original grid. Such a layer increases the size of the grid very significantly, and consequently, the number of equations is also increased. In contrast, the ABCs that use directional derivatives require just one extra layer of grid points, and thus they are more efficient than PML methods in terms of the computer time and memory required to solve a given problem.

The foundation for several ABCs is a certain mathematical condition, known as the Sommerfeld radiation condition [12]. This radiation condition involves the directional derivatives of the field value u, with the direction being away from the source of impact causing the waves. This direction is called the radial direction. The radiation condition provides a mathematical limit condition which must hold for the Helmholtz equation. ABCs that are based on the Sommerfeld condition strive to mimic the Sommerfeld radiation condition on the boundary of the grid.

Two well-known examples of ABCs that are based on the Sommerfeld radiation condition are the Engquist-Majda (EM) ABCs [5] and the Bayliss-Gunzburger-Turkel (BGT) ABCs [2]. Both of these methods have certain limitations. The EM ABCs use directional derivatives of the field value u in the direction that is orthogonal to the boundary of the domain. On box-shaped domains (which are widely used in practice), the orthogonal direction can deviate by almost 90° from the radial direction. Additionally, the orthogonal direction is not continuous across the edges and corners of such box-shaped domains. It is well known in the literature that the continuity problem contributes very significantly to inaccuracies in the solution of the Helmholtz equation, and there have been some attempts to handle this problem, such as [1]. However, none of the proposed methods offer the simple solutions presented by the Gradient Method.

The BGT method, as it was initially disclosed in [2] had certain configuration restrictions: the domain was assumed to be a sphere, and the source of impact was assumed to be at the center. Reference [9] presents an extension of BGT to elliptical bodies; however, as noted above, box-shaped domains are used extensively in many situations.

U.S. Pat. No. 6,687,659 to Shen discloses a hybrid approach for implementing absorbing boundary conditions in three dimensional (3D) finite difference (FD) acoustic applications such as post-stack and pre-stack seismic migration, and forward modeling.

SUMMARY OF THE INVENTION

The present invention, referred to herein as "the Gradient Method" (GM), provides a method and system for modifying and creating absorbing boundary conditions (ABCs) for the numerical solution of partial differential equations (PDEs) whose numerical solution requires the use of ABCs, such as the Helmholtz equation, the wave equation in the frequency domain, Maxwell's equations.

The ABCs generated by the method of the invention are consistent with the Sommerfeld radiation condition, in which the directional derivative is radial. The ABCs generated by the method of the invention tend to be continuous across the corners and edges of box-shaped domains, and, in the case of BGT ABCs, the limitations imposed on the configuration of the domain can be removed. The primary mathematical concept lying at the basis of the present invention is the fact that under Sommerfeld's conditions, the radial direction is identical to the gradient direction.

The ABCs generated by the method of the invention may be used in any computational problem which requires non-reflecting boundary conditions. This is done by imposing directional derivatives that are taken in the direction of the gradient of the field (or fields) whose solutions are sought.

The ABCs generated by the method of the invention can be used in a computer program to obtain relatively high accuracy solutions to the Helmholtz equation, thereby minimizing the computation time to obtaining the solution.

The ABCs generated by the method of the invention can be used to reduce the required computer memory in order to obtain solutions to the Helmholtz that are accurate to within a given user-defined level of accuracy.

The GM is based on the mathematical principle that any directional derivative in an ABC should be taken in the direction of the gradient of whatever field the ABC is intended to absorb. This field value is different for the different types of physical phenomenon being described by the relevant PDE. For example, for the Helmholtz equation, this value is the displacement u, and for the Maxwell equations, there are two values, for the electric and magnetic fields. In the specific case of the Helmholtz equation, the gradient direction is identical to the radial direction used in Sommerfeld's radiation condition, but there can be cases where the radial direction is irrelevant: for example, when there is one or more sources of impact and the waves impound on several reflecting objects, then only the gradient direction is relevant. Perhaps the most unique feature of the present invention, in comparison to other ABC methods, is that the gradient direction is taken at every grid point on the boundary irrespective of the shape of the boundary at that point.

A second feature of the GM is that it can serve to lift configuration restrictions of some existing ABCs. A case in point is the BGT ABCs which were originally devised for the Helmholtz equation in a sphere (in 3D) with a source of impact at the center. The BGT ABCs use directional derivatives in the radial direction, and in this restricted configuration, the radial direction coincides with both the gradient direction and with the normal (to the boundary) direction. Since the GM specifies the use of the gradient direction regardless of the boundary shape, the BGT ABCs (with gradient direction) can be used in any convex domain, and with a source of impact at any point in the domain.

The GM can be used in one of the following three modes:

As an ABC modifier: given an ABC with directional derivatives that are not identical to the gradient derivatives at all points on the boundary, then the application of the GM to that ABC specifies that every such directional derivative should be changed to the directional derivative in the gradient direction, with the derivative being of the same order as the original one. An example of such a mode is the application of the GM to the EM ABCs, whereby the normal derivatives of EM are replaced by the gradient derivatives.

As an extender to an ABC's range of applications: given an ABC which is subject to certain limitations on the shape of the boundary and/or the position of the source of the physical perturbation, and in which said limitations imply that the directional derivatives are already in the gradient direction, then the application of the GM to that ABC consists of removing the restrictions on the boundary so that any convex shape is permissible. Furthermore, the application of the GM to that ABC also consists of removing any limitations on the position of the physical perturbation within the said permissible convex domain. An example of such a mode is the application of the GM to the BGT ABCs, which were originally devised with configuration restrictions comprising of a spherical domain with a source of impact at the center. Applying the GM to the BGT ABCs consists of allowing the domain to have any convex shape, and the source of impact to be in any position in the domain.

As a tool for creating completely new ABCs. The detailed description will include an example of such an ABC for the elastic wave equation.

The gradient ABCs obtained with the GM may be implemented with a high order approximation such as a fourth order approximation. Furthermore, the implementation of the gradient ABC should preferably be done with a compact stencil. This means that each equation determined by a gradient ABC should involve an array of at most 3×3 grid points in a 2D implementation, or at most 3×3×3 grid points in a 3D implementation. [You have changed the meaning of the previous paragraph]

Additionally, in setting up the internal (non-ABC) equations according to some finite difference (FD) scheme, preference should be given to high order schemes, on a compact stencil. One example of such a scheme for the Helmholtz equation is the compact sixth order accurate FD scheme for variable wave number disclosed in [12].

The reason for the high order compact schemes for the FD equations and the ABC equations is the high accuracy obtained with such methods, as shown in [16]. The advantage of high accuracy schemes is twofold: (1) the time to obtain a required level of accuracy is much shorter than with low order schemes, and (2) low order schemes require a much smaller mesh distance than high order schemes, and so a much larger memory size is required to achieve a given level of accuracy. These savings in computation time and memory size translate into very significant economic savings.

BRIEF DESCRIPTION OF THE DRAWINGS

For better understanding of the invention and additional objects and advantages thereof, reference is made to the following detailed description and accompanying drawing of a preferred embodiment.

FIG. 1 is a schematic drawing showing an embodiment of a computer system up-on which the GM tool according to the invention can be implemented;

FIG. 2 is an example of an embodiment of the software that implements the GM tool that may reside in one of the host computer systems;

FIG. 3 is an article of manufacture or a computer readable non-transitory medium storing code to implement one embodiment of the invention is illustrated;

FIG. 4 is a flowchart showing a method for generating a final absorbing boundary condition according to one embodiment of the invention;

FIG. 5 is a flowchart showing additional steps of the method of FIG. 4.

DESCRIPTION OF THE INVENTION

1. Computer System Description

Figure 6:
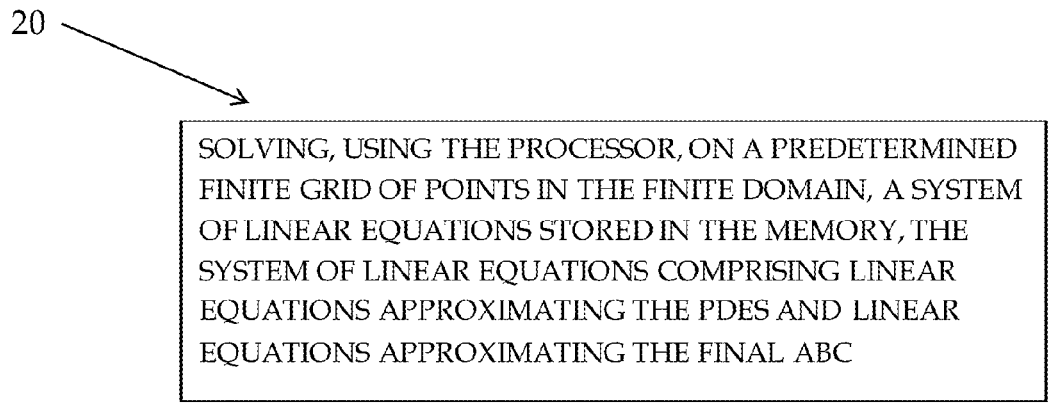
FIG. 6 is a flowchart showing an additional step of the method of FIG. 4

Referring now to FIG. 1, shown is an example of an embodiment of a computer system according to the present invention. The computer system 10 includes a data storage system 12 connected to host systems 14a-14n through communication medium 18. In this embodiment of the computer system 10, the N hosts 14a-14n may access the data storage system 12, for example, in performing input/output (I/O) operations. The communication medium 18 may be any one of a variety of networks or other type of communication connections as known to those skilled in the art. For example, the communication medium 18 may be the Internet, an intranet, or other network connection by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a-14n, as well as those components that may be included in the data storage system 12 are described herein in more detail, and may vary with each particular embodiment. Each of the host computers 14a-14n, as well as the data storage system 12, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, or Fiber Channel. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations, such as storing and retrieving data files used in connection with an application executing on one or more of the host computer systems. For example, a computer program may be executing on the host computer 14a and store and retrieve data from the data storage system 12. The data storage system 12 may include any number of a variety of different non-transitory data storage devices, such as memory, disks, tapes, and the like in accordance with each implementation. As will be described in following paragraphs, software may reside and be executing on any one of the host computer systems 14a-14n. Data may be stored locally on the host system executing software, as well as remotely in the data storage system 12 or on another host computer system. Similarly, depending on the configuration of each computer system 10, software as described herein may be stored and executed on one of the host computer systems and accessed remotely by a user on another computer system using local data. A variety of different system configurations and variations are possible then as will be described in connection with the embodiment of the computer system 10 of FIG. 1 and should not be construed as a limitation of the techniques described elsewhere herein.

Referring now to FIG. 2, shown is an example of an embodiment of the software 19 that may reside in one of the host computer systems such as whose computer system 14a-14n. Included in the software of computer system 14a of FIG. 2 is a User Interface module 20 that communicates with the ABC Generating module 22. The software further includes a Data Storage and Retrieval module 24 which communicates with the ABC Generating module 22 for performing tasks in connection with data storage and retrieval. The Data Storage and Retrieval module 24 may retrieve data files, for example, that may be stored in Libraries 26 as well as perform data operations in connection with User Data Files 28.

It should be noted that other embodiments may include other software components other than what is described and functionally represented in the software modules 19 of FIG. 2. In the embodiment shown in FIG. 2, both the Libraries and the User Data Files are shown as being stored locally within the host computer system. It should also be noted that the Libraries and/or User Data Files, as well as copies of these, may be stored in another host computer system as well as in the Data Storage System 12 of the computer system 10. However, for simplicity and explanation in paragraphs that follow, it is assumed that the software may reside on a single host computer system such as 14a with additional backups, for example, of the User Data Files and Libraries, in the Data Storage System 12.

In one embodiment, portions of the software 19, such as the user interface 20, the ABC Generating module 22, Data Storage and Retrieval module, and Libraries 26 may be included in combination in a commercially available software package. These components may operate on one of the host systems 14a-14n running one of Windows, Unix, or Linux operating systems.

The User Interface module 20 as will be described in more paragraphs that follow, may display user interface screens in connection with obtaining data used in performing modeling, simulation, and/or other problem solving for one or more systems under consideration. These one or more systems may be modeled and/or simulated by the ABC Generating module 22. Data gathered such as in connection with the User Interface 20 and used by the ABC Generating module 22 may be forwarded to the Data Storage and Retrieval module 24 where user-entered data, for example, may be stored in User Data Files 28. Additionally, other data and information may be obtained from the Libraries 26 as needed by the ABC Generating module or in connection with the User Interface 20. In this particular example, the software in the modules may be written in any one of a variety of computer programming languages such as C, C++, Java or any combination of these or other commercially available programming languages.

Additionally, various data files such as User Data Files 28 and the Libraries 26 may be stored in any one of a variety of data file formats in connection with a file system that may be used in the host computer system, for example, or in the Data Storage System 12. An embodiment may use any one of a variety of database packages in connection with the storage and retrieval of data. The User Data files 28 may also be used in connection with other software simulation and modeling packages. For example, the User Data files 28 may be stored in a format that may also be used directly or indirectly as an input to any one of a variety of other off the shelf modeling packages. In particular, an embodiment may provide for importing and exporting data between this system and an off the shelf modeling system. The precise format of the data may vary in accordance with each particular embodiment as well as the additional functionalities included therein.

Referring now to FIG. 3, an article of manufacture or a computer program product 1000 of the invention is illustrated. The computer program product 1000 includes a recording medium 1002, such as, a floppy disk, a high capacity read only memory in the form of an optically read compact disk or CD-ROM, a tape, a transmission type media such as a digital or analog communications link, or a similar computer program product. Recording medium 1002 stores program means 1004, 1006, 1008, 1010 on the medium 1002 for carrying out the methods for implementing the software 19 of the disclosed embodiments of the system 10 of FIGS. 1 and 2. A sequence of program instructions or a logical assembly of one or more interrelated modules defined by the recorded program means 1004, 1006, 1008, 1010, direct the system 100 for implementing the disclosed embodiments.

2. Preliminaries

The first embodiments are applications of the GM to ABCs for the Helmholtz equation in 3D:

$$\Delta u + K^2 u = F,$$

where u(x,y,z) is the displacement at point (x,y,z) in the three-dimensional Euclidean space $\mathbb{R}^3$, K is the wavenumber, and F(x,y,z) is a prescribed right-hand-side (RHS). $\Delta u$ is the standard notation for the Laplacian of u:

$$\Delta u = \frac{\partial^2 u}{\partial x^2} + \frac{\partial^2 u}{\partial y^2} + \frac{\partial^2 u}{\partial z^2}.$$

As is customary in the art, partial derivatives of u, such as $$\frac{\partial u}{\partial x}.$$

are abbreviated as $u_x$. In all the following, boldface letters will be used to denote vectors. Use will be made of the vector operator $$\nabla = \left(\frac{\partial}{\partial x}, \frac{\partial}{\partial x}, \frac{\partial}{\partial x}\right).$$

The gradient of u is the vector $\nabla u = (u_x, u_y, u_z)$. The direction of the vector $\nabla u$ is called the "gradient direction" of u. Given any vector $v=(a,b,c)$, its length is denoted by $\|v\|=\sqrt{a^2+b^2+c^2}$.

Given a vector $v=(a,b,c)$ of unit length (i.e., $\|v\|=1$), and a scalar function $f(x,y,z)$ defined over the domain of interest, the directional derivative of $f$ in the direction of v is defined as $\nabla f \cdot v = af_x + bf_y + cf_z$ (the symbol "•" denotes the scalar product of two vectors).

3. Application of the GM to the Engquist-Majda ABCs

The first mode of the application of the GM is to modify an existing ABC by changing all directional derivatives to derivatives (of the same order) in the gradient direction. This will be demonstrated with the Engquist-Majda (EM) ABC [5].

Engquist and Majda [5] proposed a sequence of boundary conditions based on an integer parameter $m \geq 1$. For convenience, these conditions are denoted as EMm, and EM denotes the class of all EMm methods. Given a point p on the boundary of a domain D, the unit vector perpendicular to the boundary at p in the outward direction from the boundary is denoted by n.

For $m \geq 1$, EMm is the following class of ABCs:

$$EMm: \left(\frac{\partial}{\partial n} - jK\right)^m u = 0. \tag{1}$$

where $$\frac{\partial}{\partial n}$$

is the differential operator in the direction of n, and $j=\sqrt{-1}$.

For m=1 and m=2, the following EM ABCs are obtained:

$$EM1: u_n - jKu = 0 \tag{2}$$

$$EM2: \left(\frac{\partial}{\partial n} - jK\right)^2 u = u_{nn} - 2jKu_n - K^2 u = 0. \tag{3}$$

Let $p=(x_1, y_1, z_1)$ be a point on the boundary, and g a unit vector in the gradient direction of u at p; that is, the direction of g is $\nabla u(x_1, y_1, z_1) = (u_x(x_1, y_1, z_1), u_y(x_1, y_1, z_1), u_z(x_1, y_1, z_1))$.

It should be noted that since g is a unit vector in the direction of $\nabla u$, then $$g = \frac{\nabla u}{\|\nabla u\|}.$$

In all the following, the coordinates of g are denoted as a, b, c, that is, $g=(a,b,c)$. The coefficients a, b and c depend on the position of the boundary point p, so $g(x_1,y_1,z_1)=(a(x_1,y_1,z_1), b(x_1,y_1,z_1), c(x_1,y_1,z_1))$.

The directional derivative of u in the direction of g is then given by the following equation:

$$u_g = \nabla u \cdot g = au_x | bu_y | cu_z \tag{4}$$

From equation (1) it follows that $u_{gx} = au_{xx} + bu_{xy} + cu_{xz}$, with similar expressions for $u_{gy}$ and $u_{gz}$. From this, and from applying equation (1) to $u_g$, one obtains $$\begin{aligned} u_{gg} &= \nabla(u_g) \cdot g = au_{gx} + bu_{gy} + cu_{gz} \\ &= a(au_{xx} + bu_{xy} + cu_{xz}) + b(au_{xy} + bu_{yy} + cu_{zy}) + \\ &\quad c(au_{xz} + bu_{yz} + cu_{zz}) \\ &= a^2 u_{xx} + b^2 u_{yy} + c^2 u_{zz} + 2(abu_{xy} + acu_{xz} + bcu_{yz}) \end{aligned} \tag{5}$$

The operator of differentiating in the gradient direction of g is denoted by $$\frac{\partial}{\partial g}.$$

The application of the GM to the EM ABCs yields the following class of ABCs:

$$GEMm: \left(\frac{\partial}{\partial g} - iK\right)^m u = 0. \tag{6}$$

GEM is an abbreviation for "the GM applied to EM". For m=1 and m=2, the following ABCs are obtained:

$$GEM1: u_g - jKu = 0 \tag{7}$$

$$GEM2: \left(\frac{\partial}{\partial g} - jK\right)^2 u = u_{gg} - 2jKu_g - K^2 u = 0. \tag{8}$$

Calculating $g=(a,b,c)$ at a given boundary point $p=(x_1, y_1, z_1)$ depends on the specifics of the problem being solved. In the case of a known source of impact at some point $q=(x_0, y_0, z_0)$ in the domain of interest, the calculation is straightforward: one first calculates the distance r between p and q: $r=\sqrt{(x_1-x_0)^2+(y_1-y_0)^2+(z_1-z_0)^2}$, and then the coordinates of g are given by $$a = \frac{x_1 - x_0}{r},$$

$$b = \frac{y_1 - y_0}{r},$$

$$c \frac{z_1 - z_0}{r}.$$

Another example of determining g is the case of plane waves, where the gradient direction is perpendicular to the wave front.

A different situation arises in complex problems, where there may be several sources of impact in a domain, as well as several scatterers (that is, objects which reflect the incoming waves). In this case, the direction of g is not known a priori at the boundary points. However, it is always mathematically correct that $$g = \frac{\nabla u}{\|\nabla u\|}.$$

In such a case, the solution to the problem may be obtained by a quasi-linear approach, as disclosed in [16], at the end of Section 4. The present invention may be applied to applications of the Gradient Method (GM), that use different computational methods used.

[16] contains experimental results showing the great improvement obtained by GEM over the original EM ABC, thereby confirming the efficacy of the GM.

4. Application of the GM to the Bayliss-Gunzburger-Turkel ABCs

A different approach from the EM ABCs has been disclosed by Bayliss, Gunzberger and Turkel [2]. Assuming a spherical domain with a scatterer (or a point source of impact) at the center, they constructed a series of ABCs, which, for m≥1, will be denoted by BGTm. "BGT" will be used to refer to the entire class of BGTm. Given a point p on the boundary, the distance between the source of impact and p is denoted by r, and the unit vector pointing from the source towards p is denoted by r (in boldface). The BGT ABCs are defined by a sequence of operators $B_1, B_2, \ldots$, which are defined as follows:

$$B_1 \stackrel{det}{=} \frac{\partial}{\partial r} + \left(\frac{1}{r} - jK\right), \quad (9)$$

and for m≥2, $$B_m \stackrel{det}{=} \left(\frac{\partial}{\partial r} + \frac{Zm-1}{r} - jK\right)(B_{m-1}), \quad (10)$$

$\frac{\partial u}{\partial r} = u_r$ is the derivative of u in the direction of r; the radial direction. When there is a single point source at the center of a spherical domain (and there are no additional objects in the domain), then the following three directions are identical for every point p on the boundary: the gradient direction of u at p, the outward pointing normal direction at p, and the radial direction (from the source top). This means that at the boundary point p, the following equalities hold: g=n=r. Hence, at the boundary point p, the following three directional derivatives are all identical: $u_g$, $u_n$, and $u_r$.

For m≥1, BGTm is the following boundary condition:

BGTm: $B_m u = 0$. (11)

So BGT1 is the following boundary condition:

$$BGT1: B_1 u = \frac{\partial u}{\partial r} + \left(\frac{1}{r} - jK\right)u = 0, \quad (12)$$

and BGT2 is given by:

BGT2: $B_2 u = u_{rr} + \alpha(r)u_r + \beta(r)u = 0$, (13)

where $$\alpha(r) = \left(\frac{4}{r} - 2jK\right) \text{ and } \beta(r) = \left(\frac{2}{r^2} - K^2 - \frac{4jK}{r}\right).$$

If needed, $u_{rr}$ can be represented in terms of the first order derivatives by using the Helmholtz equation. This is useful for linear finite elements where a second derivative cannot be used. For the finite difference method this is not necessary. Since $u_r = u_g$ and $u_{rr} = u_{gg}$, equations (1) and (2) can be used for calculating the directional derivatives of BGT1 and BGT2.

It should be noted that the BGT ABCs can only be used when there is a single source (or a small reflecting object) so that both r (the distance) and r (the radial direction) are defined. Another point to note is that when r→∞, then BGTm reduces to GEMm for all m≥1 (because $u_r = u_g$). In practical terms, the meaning of this mathematical statement is that if $$\frac{1}{r}$$

is small enough so that it can be considered as zero for all numerical purposes, then the BGT ABCs are the same as the GEM ABCs. Plane waves are an example of such a situation: they can be considered as originating from a source that is located infinitely far from the boundary.

The application of the GM to the BGT ABCs consists of lifting the restrictions that the domain should be spherical and that the source should be at the center. This means that the domain can be taken as any convex set, and the source can be any point in the interior. In such a general situation, the equalities g=r and $u_g = u_r$ still hold at any boundary point p. However, in contrast to the original restrictions of BGT, the outward pointing normal at p will, in general, be different from g. The equations for the various BGT ABCs will actually remain unchanged when the GM is applied, because $u_g = u_r$. The one restriction that does remain is that there is only one source in the domain; this restriction is inherent in the BGT equations because r (the distance from the source to the boundary point) appears in the equations.

The [16] contains experimental results showing that even though BGT was originally devised for a spherical domain with a source at the center, the application of the GM to BGT enables the use of BGT to box-shaped domains with a source in any position. The results show that generally, BGT produces somewhat better results than GEM, thus confirming the usefulness of this application of the GM.

5. The GM for the Elastic Wave Equation

In an elastic medium, the wave equation is governed by the laws of elasticity, and is called "the elastic wave equation". Detailed expositions appear in many textbooks, such as [10]. In the following, $U(x,y,z) = (u_1, u_2, u_3)$ is a vector field known as the displacement vector (whose components $u_1$, $u_2$, $u_3$ are the displacements in the x, y, z directions, respectively), ρ is the density, and λ and μ are the Lamé parameters.

There are basically two main types of waves:

P-waves (primary or compression waves), which travel at a speed of $$c_p = \sqrt{\frac{\lambda + 2\mu}{\rho}}.$$

S-waves (secondary or shear waves), which travel at a speed of $$c_s = \sqrt{\frac{\mu}{\rho}}.$$

If ω denotes the frequency of the waves, a wave number is introduced for the two types of waves:

$$K_p = \frac{\omega}{c_p} \text{ and } K_s = \frac{\omega}{c_s}.$$

For $1 \leq i \leq 3$, let $g_i$ be a unit vector in the direction of the gradient of $u_i$. In many situations, these vectors will coincide, but there may be situations in which they are different.

The EM ABC can be modified for the elastic wave equation in the frequency domain as follows. For every m≥2 and even, it is possible to specify the following ABC (called EMELm) for the displacement vector U of the elastic wave equation:

$$EMELm: \left(\frac{\partial}{\partial n} - jK_p\right)^{\frac{m}{2}} \left(\frac{\partial}{\partial n} - jK_s\right)^{\frac{m}{2}} u_i = 0, \text{ for } i = 1, 2, 3, \quad (14)$$

where n is the outward pointing unit vector on the boundary of the domain.

The Gradient Method (GM) is used here to the EMELm ABCs for the displacement vector U of the elastic wave equation. These ABCs are referred to herein as the "GM for Elasticity" (GMEL). For every m≥2 and even, a gradient-based ABC, denoted GMELm is introduced: as follows:

$$GMELm: \left(\frac{\partial}{\partial g_i} - jK_p\right)^{\frac{m}{2}} \left(\frac{\partial}{\partial g_i} - jK_s\right)^{\frac{m}{2}} u_i = 0, \text{ for } i = 1, 2, 3. \quad (15)$$

It should be noted that the operator on the left hand side of the expression for GM-ELm acts on the component $u_i$ of the displacement vector U, for $1 \leq i \leq 3$. Furthermore, for each component $u_i$ of the displacement vector U, the directional derivative is taken in the direction of the gradient of $u_i$. For m–2 the following ABC is obtained:

$$GMEL2: \frac{\partial^2 u_i}{\partial g_i^2} - j(K_p + K_s)\frac{\partial u_i}{\partial g_i} - K_p K_s u_i = 0, \quad (16)$$

for $i = 1, 2, 3$.

6. Additional Details of a Preferred Implementation

The following details pertain to a specific implementation of the Gradient Method (GM) for the numerical solution of the Helmholtz equation, and should not be considered as limiting the extent of application of the GM. The invention may be used in any fashion for specifying absorbing boundary conditions that use directional derivatives in a computational domain, regardless of the following:

The nature of the physical problem being solved, be it the Helmholtz equation, Maxwell's equations, or any other physical problem requiring ABCs for its numerical computation.

The nature of the resulting computational problem being solved, be it a linear or non-linear system of equations.

The mode of computation, that is, whether use is made of finite difference methods, finite elements, meshless techniques or other methods.

The specific algorithm used to solve the computational problem.

The sample numerical problem presented hereinafter consists of solving the Helmholtz equation as part of the process known in the art of exploration geophysics as "full waveform inversion" (FWI), as explained in the Background of the Invention. A detailed explanation of FWI is disclosed in [15]. The Helmholtz equation is solved under the following conditions:

The physical domain for the problem is a large box-shaped volume of the earth bounded from above by the earth surface. The volume is assigned a cartesian coordinate system, usually with the x- and y-axes laid out on the top surface of the volume, and the z-axis pointing vertically downwards into the earth. The volume is divided by three sets of equidistant parallel planes, to be called $S_1$, $S_2$, $S_3$. The distance between two parallel consecutive planes is denoted by h. Each set of such planes is perpendicular to one of the coordinate axes. For $1 \leq l \leq 3$, the planes of $S_l$ are numbered consecutively from 1 to $n_l$. Each point of intersection of three planes (one from each of the sets of parallel planes) is called a grid point. Every such grid point is indexed by the three numbers of the three planes on which it lies; thus, the grid point at the intersection of plane i of $S_1$, plane j of $S_2$, and plane k of $S_3$ is indexed by i, j, k. The total number of grid points is $N=n_1 \times n_2 \times n_3$.

The input data to the problem consists of the value of the speed of sound at each grid point. A point source of impact is also given. This point is taken as one of the grid points.

A finite difference scheme is used to approximate the Helmholtz equation at each grid point. Finite difference schemes are well known in the art, and they each have a certain so-called order of accuracy. High order accuracy schemes are always preferable to low order schemes for two main reasons: (a) for a given grid size, they provide better accuracy, and (b) for a given goal of the required accuracy, high order schemes provide the accuracy goal with a smaller grid size and in time that is several orders of magnitude better than the time required by a low order scheme. The sixth order accurate compact scheme for variable wave number, for example, as disclosed in [12] may be used since it provides high accuracy, it is suitable for heterogeneous domains, and it is compact (meaning that every equation involves only a 3×3×3 cube of grid points). Compact schemes, in general, are more suitable for use with parallel domain decomposition solution methods, such as the CARP-CG algorithm [7], which was used, for example, in [16] and in references [8], [12] and [13].

A finite difference scheme is also used to approximate the absorbing boundary conditions that are imposed on the boundaries of the domain. ABCs based on the Gradient Method (GM) can be used in order to increase the accuracy of the ABC. One can choose, for example, the GEM ABC described above, or the BGT ABC (generalized by the GM to allow an arbitrary convex domain with a source of impact at any point).

The chosen ABC should be approximated to a high order in order to improve the accuracy of the solution. Preferably, a compact scheme should be used, since this will minimize the number of extra grid points that must be added to the original grid. With a compact scheme, only one layer of grid points needs to be added to the original grid. Also, as mentioned above, compact schemes are more suitable for use with domain decomposition solution methods. The next item provides a detailed description of such an ABC scheme.

The following equation is an example of an implementation of a fourth order approximation of the BGT1 ABC. The equations are centered about a grid point on the boundary of the original grid, whose indices are i, j and k. As mentioned above, h denotes the mesh distance (the distance between two adjacent grid points), and K is the wave number. As described previously, u is the unknown displacement, which is calculated at every grid point ($u_{i,j,k}$, $u_{i+1,j,k}$, and so on). The letter 'A' with appropriate indices is the coefficient of the unknown value of u with the corresponding indices. The general form of a compact equation, centered about a grid point with indices i, j, k, is $$\sum_{\ell,m,n \in \{-1,0,+1\}} A_{i+\ell,j+m,k+n} u_{i+\ell,j+m,k+n} = C_{i,j,k}. \qquad (17)$$

In general, such an equation can contain up to 27 elements (all the points in a 3×3×3 cube of grid points) However, in the case of the BGT1 ABC, at most two of the indices have a +1 or −1 attached to them, meaning that the coefficients of the eight corner grid points (of the 3×3×3 cube of grid points) are all zero. In the following equations for the coefficients, r is the distance from the source to the boundary grid point indexed by i, j, k, and (a,b,c) is a unit vector in the direction from the source to the boundary point. It should be noted that the boundary points belong to the original grid (without the extra grid points for the ABC); however, each such boundary point also borders at least on extra grid point required by the ABC. The values of the coefficients are:

$$A_{i,j,k} = \frac{h}{r} - jKh, \qquad A_{i\pm1,j,k} = \pm\frac{a}{6}\left(1 + \frac{K^2 h^2}{2}\right)$$

$$A_{i,j\pm1,k} = \pm\frac{b}{6}\left(1 + \frac{K^2 h^2}{2}\right), \quad A_{i,j,k\pm1} = \pm\frac{c}{6}\left(1 + \frac{K^2 h^2}{2}\right)$$

$$A_{i+1,j\pm1,k} = \frac{a \pm b}{12}, \qquad A_{i-1,j\pm1,k} = \frac{-a \pm b}{12}$$

$$A_{i+1,j,k\pm1} = \frac{a \pm c}{12}, \qquad A_{i-1,j,k\pm1} = \frac{-a \pm c}{12}$$

$$A_{i,j+1,k\pm1} = \frac{b \pm c}{12}, \qquad A_{i,j-1,k\pm1} = \frac{-b \pm c}{12}$$

As mentioned earlier, when the distance r goes to infinity, the BGTm ABC becomes identical to the GEMm ABC. This means that GEM1 can be obtained from BGT1 simply by setting $$\frac{1}{r} = 0$$

in the above expression for $A_{i,j,k}$, yielding $A_{i,j,k} = -jKh$, and there is no change in the other expressions. Similarly, GEM2 is obtained from BGT2 by setting $$\frac{1}{r} = 0.$$

In order to solve the resulting system of equations, an algorithm is required. The Helmholtz equation is well known for the difficulty it presents to many solution methods. Among the various methods available, the CARP-CG parallel method [7] presents many advantages. Besides its use in [12] and [16], it was also used for the Helmholtz equation in [13] and [14], and also for the elastic wave equation in the frequency domain in [8].

7. Description of the Claims

The claimed invention will now be described with reference to FIGS. 4-6, showing flowcharts showing the methods according to the invention. According to one embodiment a computer implemented method is provided for generating a final absorbing boundary condition (ABC) for a physical phenomenon consisting of one or more fields, occurring in a domain having a boundary, and being described by one or more partial differential equations. The computer includes a non-transitory computer readable memory, an input device, an output device, and a processor. The method includes at step 10, inputting, using the input device, a preliminary ABC for the one or more fields to be stored in the memory of the computer; said preliminary ABC containing at least one directional derivative of at least one field selected from the one or more fields, each selected field having a gradient. In step 12, using the processor, replacing one or more of the directional derivatives in the preliminary ABC with a directional derivative in the direction of the gradient of at least one of the selected field, in the gradient direction of the field, to obtain a final ABC; and in step 14, outputting, on the output device, a representation of the final ABC for the physical phenomenon.

Additionally, according to one embodiment, one or more steps selected from the following steps is performed. If the preliminary ABC is limited by at least one restriction on a configuration of the domain, the at least one restriction on the configuration is removed to allow for a domain of any convex shape (step 16) and if the preliminary ABC is limited by at least one restriction on the position of a source of impact causing the physical phenomenon, the at least one restriction on the position is removed to allow the source of impact to be in any position within the domain (step 18).

According to one embodiment, the preliminary ABC is represented by Equation (1):

$$EMm: \left(\frac{\partial}{\partial n} - jK\right)^m u = 0, \qquad (1)$$

wherein m is an integer m≥1, and the final ABC is obtained by changing the directional derivative of the field value u to a directional derivative in the direction of the gradient of u, resulting in the ABC given by Equation (6):

$$GEMm: \left(\frac{\partial}{\partial y} - jK\right)^m u = 0, \quad (6)$$

for the same integer m.

According to one embodiment, the preliminary ABC is provided by Equations (9) to (11):

$$B_1 \stackrel{def}{=} \frac{\partial}{\partial r} + \left(\frac{1}{r} - jK\right), \quad (9)$$

and for m≥2, $$B_m \stackrel{def}{=} \left(\frac{\partial}{\partial r} + \frac{2m-1}{r} - jK\right)(B_{m-1}). \quad (10)$$

$$BGTm: B_m u = 0. \quad (11)$$

wherein at least one of the following restrictions in the preliminary ABC is removed: 1) the restriction that the domain is a sphere; and 2) the restriction that the point of impact is located at the center of the sphere.

According to one embodiment, the preliminary ABC is provided by Equation (14):

$$EMELm: \left(\frac{\partial}{\partial n} - jK_p\right)^{\frac{m}{2}} \left(\frac{\partial}{\partial n} - jK_c\right)^{\frac{m}{2}} u_i = 0, \text{ for } i = 1, 2, 3, \quad (14)$$

wherein m is an even integer m≥2, and the final ABC is obtained by replacing the directional derivative in each sub-equation of Equation (14) with the directional derivative in the direction of $g_i$, $g_i$ being a unit vector in the direction of the gradient of $u_i$, for i=1, 2, 3, resulting in Equation 15:

$$GMELm: \left(\frac{\partial}{\partial y_i} - jK_p\right)^{\frac{m}{2}} \left(\frac{\partial}{\partial y_i} - jK_c\right)^{\frac{m}{2}} u_i = 0, \text{ for } i = 1, 2, 3. \quad (15)$$

According to one embodiment, a computer readable non-transitory medium is provided, configured to be read by a computer, the medium embodying a computer readable representation of an absorbing boundary condition (ABC) for a physical phenomenon having one or more field values, each field value having an associated gradient and generated by one or more sources of impact in a domain having a shape and a boundary. The ABC includes at least one directional derivative in the direction of the associated gradient of one of the field values of the physical phenomenon; wherein there are no restrictions on the shape of the domain; and wherein there are no restrictions on the positions of the sources of impact.

According to one embodiment, in the computer readable representation of the ABC for the physical phenomenon, the ABC is a gradient-based ABC that is represented by Equation (15):

$$GMELm: \left(\frac{\partial}{\partial g_i} - jK_p\right)^{\frac{m}{2}} \left(\frac{\partial}{\partial g_i} - jK_c\right)^{\frac{m}{2}} u_i = 0, \text{ for } i = 1, 2, 3. \quad (15)$$

wherein m is an even integer in m≥2 and $g_i$ is a unit vector in the direction of the gradient of $u_i$, for i=1, 2, 3.

According to one embodiment, a method is provided for calculating one or more field values of a physical phenomenon occurring in a finite domain and described by one or more partial differential equations (PDEs) and initial data, the method being implemented on the computer. The method includes solving, using the processor, on a predetermined finite grid of points in the finite domain, a system of linear equations stored in the memory, the system of linear equations comprising linear equations approximating the PDEs and linear equations approximating the final ABC (step 20).

According to one embodiment, the final ABC is selected from 1) an ABC for a physical phenomenon having one or more field values, each field value having an associated gradient and generated by at least one source of impact in a domain having a shape and a boundary, the ABC comprising at least one directional derivative in the direction of the gradient of one of the field values of the physical phenomenon; wherein there are no restrictions on the shape of the domain; and wherein there are no restrictions on the positions of the sources of impact; and 2) an ABC which is represented by Equation (15):

$$GMELm: \left(\frac{\partial}{\partial g_i} - jK_p\right)^{\frac{m}{2}} \left(\frac{\partial}{\partial g_i} - jK_c\right)^{\frac{m}{2}} u_i = 0, \text{ for } i = 1, 2, 3. \quad (15)$$

wherein m is an even integer m≥2 and $g_i$ is a unit vector in the direction of the gradient of $u_i$, for i=1, 2, 3.

According to one embodiment, the PDEs comprise a Helmholtz equation and the initial data comprises values of a speed of sound at every grid point.

According to one embodiment, the physical phenomenon whose solution is sought is an elastic wave equation having two velocities in the frequency domain and wherein the initial data comprises a velocity of P-waves and a velocity of S-waves at every grid point.

Although various features of the invention have been described with particular embodiments. It is considered within one of ordinary skill in the art to mix and match the features in other embodiments not depicted in the figures.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

The invention claimed is:

1. A computer implemented method for generating a final absorbing boundary condition (ABC) for a numerical simulation of a physical phenomenon consisting of one or more fields, occurring in a domain having a boundary, and being described by one or more partial differential equations (PDEs), the computer comprising a non-transitory computer readable memory, an input device, an output device, and a processor, the method comprising:
inputting, using the input device, a preliminary ABC for the one or more fields to be stored in the non-transitory computer readable memory of the computer; said preliminary ABC containing at least one directional derivative of at least one field selected from the one or more fields, each selected field having a gradient;
using the processor, replacing one or more of the directional derivatives in said preliminary ABC with a numerical approximation of a directional derivative in a direction of the gradient of at least one of the selected fields, to obtain the final ABC that is stored in the non-transitory computer readable memory;
using the processor, implementing the final ABC and the one or more PDEs as a system of equations;
storing, using the processor, the system of equations in the non-transitory computer readable memory;
using the processor, to obtain a solution to the system of equations; and
applying the solution to the system of equations, to produce, on the output device, a representation of the physical phenomenon.

2. The method according to claim 1, further comprising one or more steps selected from:
if said preliminary ABC is limited by at least one restriction on a configuration of the domain, then at least one restriction on the configuration is removed to allow for a domain of any shape; and
if said preliminary ABC is limited by at least one restriction on the positions of a sources of impact causing said physical phenomenon, then at least one such restriction is removed to allow the sources of impact to be in any position within the domain.

3. A method according to claim 2, wherein the preliminary ABC is provided by Equations (III) to (V):

$$B_1 \stackrel{def}{=} \frac{\partial}{\partial r} + \left(\frac{1}{r} + jK\right), \quad \text{(III)}$$

and for $m \geq 2$, $$B_m \stackrel{def}{=} \left(\frac{\partial}{\partial r} + \frac{2m-1}{r} - jK\right)(B_{m-1}), \quad \text{(IV)}$$

$$BGTm: B_m u = 0, \quad \text{(V)}$$

wherein r is a vector of unit length in the direction from the source to a point on the boundary and r is the distance between the source to the boundary point; and
wherein one or more of the following two restrictions in the preliminary ABC is removed:
the restriction that the boundary of the domain is a sphere; and
the restriction that the point of impact is located at the center of the sphere.

4. A method according to claim 1, wherein the preliminary ABC is represented by Equation (I):

$$EMm: \left(\frac{\partial}{\partial n} - jK\right)^m u = 0, \quad \text{(I)}$$

wherein in is an integer $m \leq 1$, n is a unit vector in a direction normal to the boundary and pointing outwards from the domain, $j = \sqrt{-1}$, K is the wavenumber, and the final ABC is obtained by changing the directional derivative of the field value u to a directional derivative in the direction of the gradient of u, resulting in the ABC given by Equation (II):

$$GEMm: \left(\frac{\partial}{\partial g} - jK\right)^m u = 0 \quad \text{(II)}$$

for the same integer m, where g is a unit vector in the direction of the gradient of u.

5. A method according to claim 1, wherein the preliminary ABC is provided by Equation (VI):

$$EMELm: \left(\frac{\partial}{\partial n} - jK_p\right)^{\frac{m}{2}} \left(\frac{\partial}{\partial n} - jK_s\right)^{\frac{m}{2}} u_i = 0, \text{ for } i = 1, 2, 3, \quad \text{(VI)}$$

wherein m is an even integer $m \geq 2$, and the final ABC is obtained by replacing the directional derivative in Equation (VI) with the directional derivative in the direction of $g_i$, $g_i$, being a unit vector in the direction of the gradient of $u_i$, for i=1,2,3, resulting in Equation (VII):

$$GMELm: \left(\frac{\partial}{\partial g_i} - jK_p\right)^{\frac{m}{2}} \left(\frac{\partial}{\partial g_i} - jK_s\right)^{\frac{m}{2}} u_i = 0, \text{ for } i = 1, 2, 3. \quad \text{(VII)}$$

6. A method for calculating one or more field values of a physical phenomenon occurring in a finite domain and described by one or more partial differential equations (PDEs) and initial data, the method being implemented on the computer, the method comprising:
solving, using the processor, on a predetermined finite grid of points in the finite domain, a system of equations stored in the memory, the system of equations comprising linear equations approximating the PDEs and linear equations approximating the final ABC obtained by the method of claim 1.

7. The method according to claim 6 wherein the final ABC is selected from:
an ABC for a physical phenomenon having one or more field values, each field value having an associated gradient and generated by at least one source of impact in a domain having a shape and a boundary, the ABC comprising at least one directional derivative in the direction of the gradient of one of the field values of the physical phenomenon; wherein there are no restrictions on the shape of the domain; and wherein there are no restrictions on the positions of the sources of impact; or,
an ABC which is represented by Equation (IX):

$$GMELm: \left(\frac{\partial}{\partial g_i} - jK_p\right)^{\frac{m}{2}} \left(\frac{\partial}{\partial g_i} - jK_s\right)^{\frac{m}{2}} u_i = 0, \text{ for } i = 1, 2, 3, \quad \text{(IX)}$$

wherein m is an even integer m≥2, $u_1$, $u_2$, $u_3$ are the three displacement components of the elastic wave equation, $K_p$ and $K_s$ are the wavenumbers of the elastic wave equation, and $g_i$ is a unit vector in the direction of the gradient of $u_i$, for i=1,2,3.

8. A method in accordance with claim 6, wherein the PDEs comprise a Helmholtz equation and the initial data comprises values of a speed of sound at every grid point.

9. A method in accordance with claim 6, wherein the physical phenomenon whose solution is sought is an elastic wave equation having two velocities, and wherein the initial data comprises a velocity of P-waves and a velocity of S-waves at every grid point.

10. A computer readable non-transitory storage medium, configured to be read by a computer processor, said medium embodying computer readable code comprising:
   instructions, when executed by the computer processor, that:
   implement an absorbing boundary condition (ABC) for a physical phenomenon having one or more field values, each field value having an associated gradient and generated by one or more sources of impact in a domain having a shape and a boundary, the ABC comprising at least one directional derivative in the direction of the associated gradient of one of the field values of the physical phenomenon, the step of implementing comprising instructions configured to:
   receive from an input device, a preliminary ABC for the one or more fields to be stored in the non-transitory computer readable memory of the computer; said preliminary ABC containing at least one directional derivative of at least one field selected from the one or more fields, each selected field having a gradient;
   replace one or more of the directional derivatives in said preliminary ABC with a numerical approximation of a directional derivative in a direction of the gradient of at least one of the selected fields, to obtain a final ABC that is stored in the non-transitory computer readable memory;
   implement the final ABC as a system of equations;
   store the system of equations in the non-transitory computer readable memory;
   obtain a solution to the system of equations; and
   apply the solution to the system of equations, to produce, on the output device, a representation of the physical phenomenon,
   wherein there are no restrictions on the shape of the domain so that any convex shape is permissible; and
   wherein there are no restrictions on positions of the one or more sources of impact.

11. The computer readable non-transitory medium according to claim 10, wherein the ABC is a gradient-based ABC that is represented by Equation (VIII):

$$GMELm: \left(\frac{\partial}{\partial g_i} - jK_p\right)^{\frac{m}{2}} \left(\frac{\partial}{\partial g_i} - jK_s\right)^{\frac{m}{2}} u_i = 0, \text{ for } i = 1, 2, 3, \qquad \text{(VIII)}$$

wherein m is an even integer m≥2, $u_1$, $u_2$, $u_3$ are the three displacement components of the elastic wave equation, $K_p$ and $K_s$ are the wavenumbers of the elastic wave equation, and $g_i$, is a unit vector in the direction of the gradient of $u_i$, for i=1,2,3.

* * * * *